(12) United States Patent
Ishiguro et al.

(10) Patent No.: US 6,645,122 B2
(45) Date of Patent: Nov. 11, 2003

(54) CONTROL SYSTEM FOR AN AUTOMATIC TRANSMISSION

(75) Inventors: Toshiaki Ishiguro, Chita (JP); Masanori Mori, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/994,821

(22) Filed: Nov. 28, 2001

(65) Prior Publication Data

US 2002/0103056 A1 Aug. 1, 2002

(30) Foreign Application Priority Data

Nov. 28, 2000 (JP) ........................................ 2000-361368

(51) Int. Cl.$^7$ .................... F16H 59/48; F16H 61/40; F16H 59/60; F16H 59/72
(52) U.S. Cl. ...................... 477/120; 477/69; 477/97; 477/189; 475/120; 701/65
(58) Field of Search .................. 477/92, 93, 95, 477/120, 117, 119, 123, 190, 196, 198, 189, 69, 97; 701/65; 192/219.1, 219.2; 475/114, 120, 121, 127

(56) References Cited

U.S. PATENT DOCUMENTS

| | | | | |
|---|---|---|---|---|
| 4,309,918 A | * | 1/1982 | Miller et al. | ............... 477/92 |
| 4,658,676 A | * | 4/1987 | Furusawa et al. | ............ 477/125 |
| 5,052,531 A | * | 10/1991 | Bota | ................. 192/219.1 |
| 5,820,515 A | | 10/1998 | Fukaya et al. | |
| 5,830,105 A | * | 11/1998 | Iizuka | ........................ 477/92 |
| 6,039,673 A | | 3/2000 | Mikami et al. | |
| 6,249,735 B1 | * | 6/2001 | Yamada et al. | ............... 701/65 |
| 6,317,671 B1 | * | 11/2001 | Tsutsui et al. | ................ 701/51 |
| 6,328,672 B1 | * | 12/2001 | Eguchi | ......................... 477/92 |
| 6,411,881 B1 | * | 6/2002 | Thomas | ...................... 701/67 |

FOREIGN PATENT DOCUMENTS

| | | |
|---|---|---|
| JP | 9-264419 A | 10/1997 |
| JP | 11-166614 A | 6/1999 |

\* cited by examiner

Primary Examiner—Sherry Estremsky
Assistant Examiner—Tisha D. Lewis
(74) Attorney, Agent, or Firm—Burns, Doane, Swecker & Mathis, LLP (57) ABSTRACT

A control system for an automatic transmission includes a torque converter which hydraulically transmits rotation of the driving power source to the speed change gear unit, a first friction engagement element, a second friction engagement element, a third friction engagement element, a vehicle stopping detecting mechanism for detecting a vehicle stopped condition when a forward driving range is selected, a vehicle weight detector, and a controller. The controller controls the disengagement of the first and second friction engagement elements and the engagement of the third friction engagement element with an engaging force in response to the vehicle weight when the vehicle stopped condition is detected while the forward driving range is selected.

16 Claims, 4 Drawing Sheets

Fig.4

CONTROL SYSTEM FOR AN AUTOMATIC TRANSMISSION

This application is based on and claims priority under 35 U.S.C. §119 with respect to Japanese Patent Application 2000-361368 filed on Nov. 28, 2000, the entire content of which Is incorporated herein by reference.

FIELD OF THE INVENTION

This invention generally relates to a control system for an automatic transmission. More particularly, this invention pertains to a neutral control and a hill-hold control performed by a control system for an automatic transmission.

BACKGROUND OF THE INVENTION

Conventional automatic transmissions are controlled to establish a neutral condition when a driving range has been selected and a vehicle is under a stopped condition. This is generally called a neutral control. However, these types of automatic transmissions suffer from certain disadvantages in that when the neutral control is performed in the transmission, no vehicle-driving power is generated. Further, a vehicle located on an up-hill or incline may move backward.

To address these drawbacks, recent developments have led to an automatic transmission provided with a mechanism for preventing the output shaft from being rotated in a reverse direction. The automatic transmission performs the neutral control while a hill-hold control is performed. This type of automatic transmission is disclosed in Japanese Patent Application Toku-Kai-Hei 11-166614. The disclosed automatic transmission is provided with a hydraulic power transmission connected to an engine, a clutch, a brake, a stop state detector, a clutch disengaging mechanism, and a brake engaging device. The clutch is engaged when a forward driving range is selected. The brake is engaged to prevent the vehicle from moving backward and to thereby establish the hill-hold state in the transmission. The stop state detector detects "a vehicle stopped state" when the accelerator pedal is released and the brake pedal is depressed. The clutch disengaging mechanism performs the neutral control upon the clutch being almost disengaged when the vehicle-stopped state is detected by the stop state detector. The brake engaging mechanism performs the hill-hold control upon the brake being engaged when the clutch is almost disengaged by the clutch disengaging mechanism.

With the above-disclosed automatic transmission provided with the aforementioned features, the neutral control is performed without a load on the engine. Improvements in fuel consumption may be realized and the transmission of engine vibration to the driver's seat may be prevented.

However, the above-disclosed automatic transmission may still suffer from certain drawbacks. For example, the hill-hold control is performed without regard to the vehicle weight. When the hill-hold control is employed for a vehicle, for example a commercial vehicle, in which the load may vary to a relatively large extent, sufficient brake engaging pressure may not be generated in the event the load is relatively large. Therefore, it may not be possible to perform a sufficient hill-hold control.

Of course, the brake engaging pressure may be set to be large enough to perform the hill-hold control for the situation when the load of the vehicle is relatively large. However, when the vehicle provided with a large set brake engaging pressure is not accelerated on a steep up-hill with a relatively small vehicle load, the vehicle is not retracted backward or does not roll backward. Therefore, a driver may feel uncomfortable driving the vehicle.

Accordingly, the disclosed automatic transmission is susceptible of certain improvements with respect to performing an appropriate hill-hold control corresponding to variations in the vehicle weight while the neutral control is performed.

SUMMARY OF THE INVENTION

A control system for an automatic transmission includes a torque converter, a first friction engagement element, a second friction engagement element, and a third friction engagement element. The torque converter is disposed between a driving power source and a speed change gear unit, and is employed for hydraulically transmitting rotation of the driving power source to the speed change gear unit. The first friction engagement element is engageable to connect the torque converter and the speed change gear unit, while the second friction engagement element is engageable to perform a forward driving shift stage in the speed change gear unit. The third friction engagement element is engageable to generate a force to prevent an output shaft of the driving power source from being rotated in a reverse direction, and to change the force in response to an engaging force of the third friction engagement element. The control system for the automatic transmission further includes a vehicle stopping detecting means, a vehicle weight detecting means, and a control means. The vehicle stopping detecting means detects a vehicle stopped condition when the forward driving range is selected, and the vehicle weight detecting means detects the vehicle weight. The control means controls the disengaging operation of the first and second friction engagement elements, and the engaging operation of the third friction engagement element by the engaging force in response to the vehicle weight detected by the vehicle weight detecting means when the vehicle stopped condition is detected by the vehicle stopping detecting means while the forward driving range is selected.

Accordingly, when a neutral control is performed with the first and second friction engagement elements disengaged while the forward driving range has been selected, a sliding loss in the torque converter is decreased. Further, in response to a vehicle weight, a hill-hold control is performed to change the force to prevent the output shaft of the driving power source from being rotated in the reverse direction.

The first and second friction engagement elements may be formed by a single friction engagement element so that the number of elements to be controlled upon the neutral control is preferably decreased.

Another aspect of the invention involves a method of controlling a vehicle automatic transmission that includes a torque converter which hydraulically transmits rotation of a driving power source having an output shaft to a speed change gear unit, a first friction engagement element engageable to connect the torque converter and the speed change gear unit, a second friction engagement element engageable to perform a forward driving shift stage in the speed change gear unit, and a third friction engagement element engageable to generate an engaging force to prevent the output shaft from being rotated in a reverse direction. The method includes determining a weight of the vehicle, determining a stopped condition of the vehicle when a forward driving range is selected, and controlling a disengaging operation of the first and second friction engagement elements and an engaging operation of the third friction engagement element by the engaging force based on the determined weight of the vehicle when the vehicle is determined to be stopped while the forward driving range is selected.

BRIEF DESCRIPTION OF THE DRAWING FIGURES

The foregoing and additional features and characteristics of the present invention will become more apparent from the following detailed description considered with reference to the accompanying drawing figures.

DETAILED DESCRIPTION OF THE INVENTION

Figure 1:
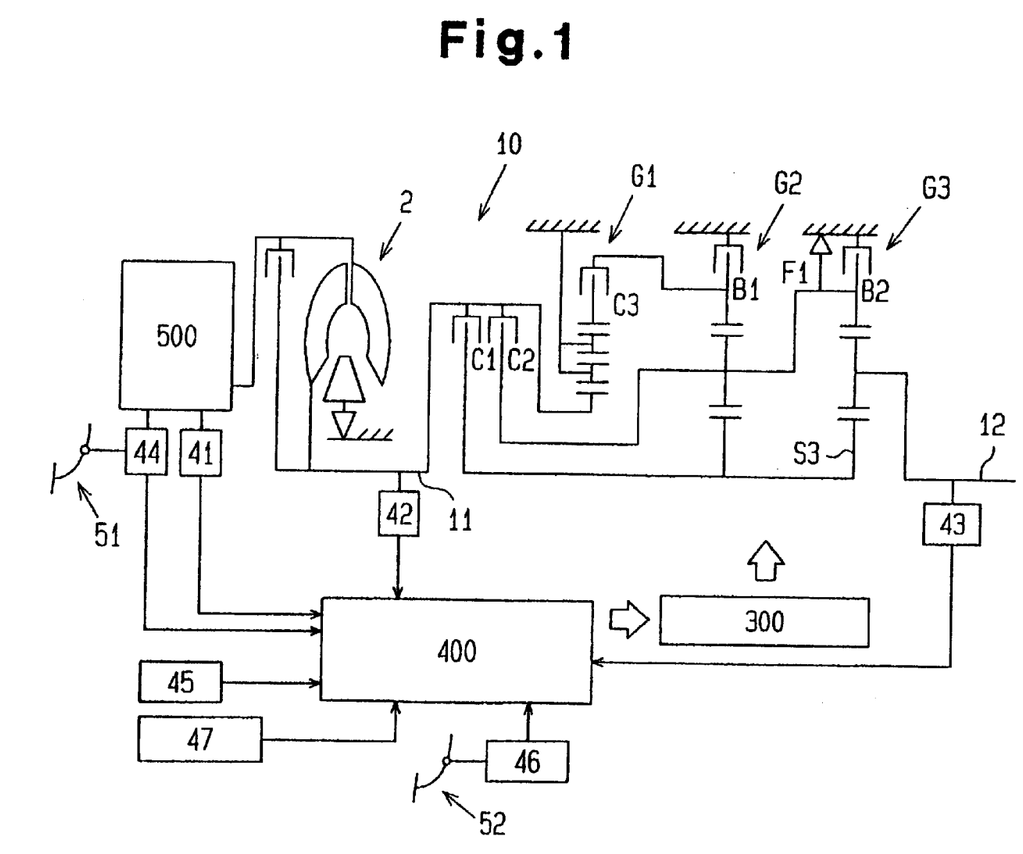
FIG. 1 is a schematic illustration of a control system for an automatic transmission according to an embodiment of the present invention.

Referring to FIG. 1, a control system for an automatic transmission according to an embodiment of the present invention includes an automatic transmission 10 (speed change gear unit) connected to an output shaft of an engine 500 (driving power source), a hydraulic control unit 300 (control means), and an electronic control unit (ECU) 400 (control means). The hydraulic control unit 300 controls oil pressure supplied to and discharged from five hydraulically driven friction engagement element which are described below in more detail. Details associated with the hydraulic control unit 300 are described below with reference to the hydraulic circuit diagram illustrated in FIG. 2. The ECU 400 is employed as a control unit for controlling operations of a plurality of solenoid valves provided in the hydraulic control unit 300.

The automatic transmission 10 is provided with an input shaft 11 which also serves as an output shaft of a torque converter 2, an output shaft 12 connected to an axle shaft via a differential unit (not shown), a gear train including a first planetary gear unit G1 with double pinion gears, a second planetary gear unit G2 with a single pinion gear, and a third planetary gear unit G3 with a single pinion gear. The planetary gear units G1, G2, G3 are respectively connected with the input shaft 11 via respective sun gears. The automatic transmission 10 is further provided with the five friction engagement elements, including a first friction clutch C1 forming first and second friction engagement elements), a second friction clutch C2, a third-friction clutch C3, a first friction brake B1 forming a third friction engagement element, a second friction brake B2, and a one-way clutch F1. The hydraulic control unit 300 and the ECU 400 switch the oil pressure supply to the respective five friction engagement elements, whereby the automatic transmission 10 performs six forward shift stages and a single reverse shift stage.

Figure 2:
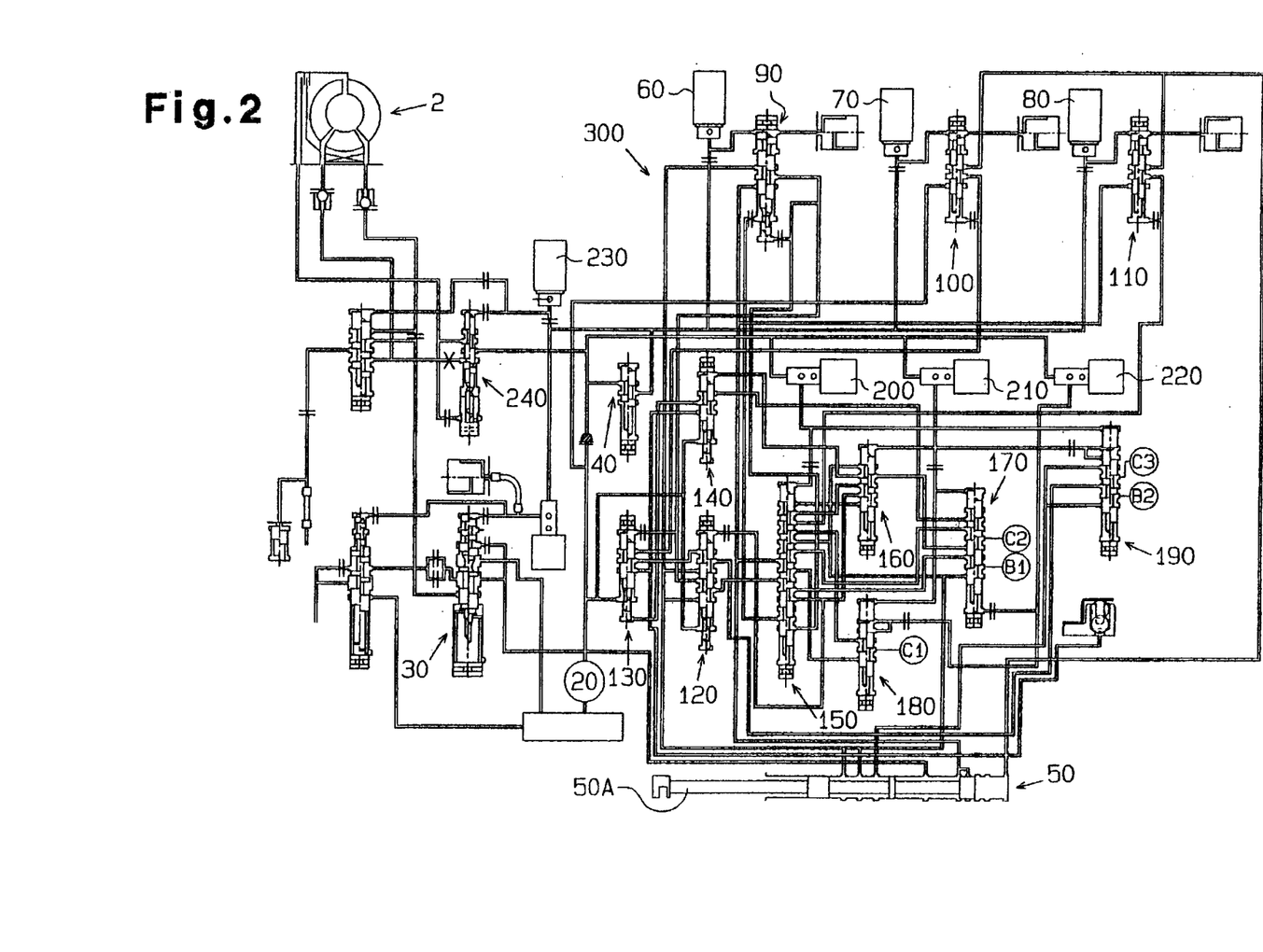
FIG. 2 is a hydraulic circuit diagram for the automatic transmission illustrated in FIG. 1.

Referring to the hydraulic circuit diagram illustrated in FIG. 2, the hydraulic control unit 300 is provided with an oil pump 20, a regulator valve 30, a modulator valve 40, a manual valve 50, several linear solenoid valves (first SOL valves) 60, 70, 80, several control valves 90, 100, 110, several fail valves 120, 130, 140, several shift valves 150, 160, 170, 180, 190, and several ON-OFF solenoid valves (second SOL valves) 200, 210, 220. The modulator valve 40 decreases the line pressure generated by the regulator valve 30. The linear SOL valves 60, 70, 80 use oil pressure from the oil pump 20 via the regulator valve 30 and consecutively generate regulated pressure corresponding to electric current. In this case, the oil pressure used by the linear SOL valves 60, 70, 80 is not limited to the oil pressure directly supplied from the oil pump 20 and comprises oil pressure supplied from the oil pump 20 via other valves as well.

The control valves 90, 100, 110 introduce the regulated pressure from the linear SOL valves 60, 70, 80 and generates control pressure corresponding to oil pressure introduced to the control valves 90, 100, 110. The fail valves 120, 130, 140 introduce the control pressure outputted respectively from the control valves 90, 100, 110 and prevent each of the friction engagement elements from double engagement. The shift valves 150, 160, 170, 180, 190 introduce the control pressure outputted from the control valves 90, 100, 110 via the fail valves 120, 130, 140 and switch the supply of the control pressure supplied to each friction engagement element corresponding to the oil pressure supplied to the shift valves 150, 160, 170, 180, 190. The ON-OFF SOL valves 200, 210, 220 switch a position of each shift valve 150, 160, 170, 180, 190 in response to electric current. Further, the ON-OFF SOL valves 200, 210, 220 switch the output pressure generated in response to the supply of electric current.

The manual valve 50 is a spool valve provided with a spool 50A that is axially movable in response to operation of a manual shift lever operated by a driver. The manual valve 50 employs the spool 50A for performing a shift operation amongst seven ranges shown in Table 1 below. This table shows the relationship between each range of the manual valve 50 and the engagement/disengagement of each friction engagement element, wherein "P" designates a parking range, "R" designates a reverse driving range, "N" designates a neutral range, "D" designates a forward driving range, "3RD" designates a third shift stage, "2nd" designates a second shift stage, and "L" designates a low driving range. The manual valve 50 is employed to switch oil supplied between the oil pump 20 and the control valve 90 and oil supplied between the oil pump 20 and the shift valves 150, 160, 170, 180, 190.

TABLE 1

| | | C1 | C2 | C3 | B1 | B2 | F1 |
|---|---|---|---|---|---|---|---|
| | R | | | ○ | | ○ | |
| | P | | | | | | |
| | N | | | | | | |
| D | 1 | ○ | | | | | ○ |
| | 2 | ○ | | | ○ | | |
| | 3 | ○ | | ○ | | | |
| | 4 | ○ | ○ | | | | |
| | 5 | | ○ | ○ | | | |
| | 6 | | ○ | | ○ | | |
| 3 | 1 | ○ | | | | | ○ |
| | 2 | ○ | | | ○ | | |
| | 3 | ○ | | ○ | | | |
| 2 | 1 | ○ | | | | ○ | ○ |
| | 2 | ○ | | | ○ | | |
| L | 1 | ○ | | | | ○ | ○ |
| R | ○ | | | ENGAGE | | | |
| M | BLANK | | | DISENGAGE | | | |
| K | | | | | | | |
| S | | | | | | | |

The ECU 400 controls the control pressure supplied to each friction engagement element only by electrically controlling the linear SOL valves 60, 70, 80 and sets a plurality of shift patterns for performing a predetermined shift stage. The ECU 400 does not switch the electric current supplied to each ON-OFF SOL valve 200, 210, 220 upon each shift pattern. According to the disclosed embodiment of the present invention, the ECU 400 provides seven shift patterns (patterns 1 through 7) by combining the ON-OFF SOL valves 200, 210, 220 that are respectively electrically excited (energized) or electrically de-excited (de-energized) as shown in Table 2 below.

According to the disclosed embodiment of the present invention, the regulated pressure reaches a maximum level when the linear SOL valves 60, 70, 80 are not electrically excited. The regulated pressure is gradually decreased corresponding to an increase of electric current. The regulated pressure is not supplied to the control valves 90, 100, 110 when the electric current reaches a maximum level. That is, the control pressure outputted from the control valves 90, 100, 110 reaches a maximum level when the linear SOL valves 60, 70, 80 are not electrically excited. The control pressure is gradually decreased corresponding to the increase of the electric current to the linear SOL valves 60, 70, 80. No control pressure is generated when the electric current reaches a maximum level.

The ON-OFF SOL valve 200 is a normally open-type valve, wherein oil pressure is supplied to the shift valves 150, 160, 170, 180, 190 when the ON-OFF SOL valve 200 is not electrically excited, and the oil pressure is not supplied thereto when the ON-OFF SOL valve 200 is electrically excited. The ON-OFF SOL valves 210, 220 are normally closed-type valves, wherein the oil pressure is supplied to the shift valves 150, 160, 170, 180, 190 when the ON-OFF SOL valves 210, 220 are electrically excited, and the oil pressure is not supplied to the shift valves 150, 160, 170, 180, 190 when the ON-OFF SOL valves 210, 220 are not electrically excited. The hydraulic circuit unit 300 is further provided with a linear solenoid valve 230. The linear-SOL valve 230 generates regulated pressure for a lock-up control valve 240 for controlling a lock-up of the torque converter 2.

As illustrated in FIG. 1, the ECU 400 is provided with a microcomputer and is connected to an engine rotational speed sensor 41, an input shaft rotational speed sensor 42, an output shaft rotational speed sensor 43 (vehicle stopping detecting means), an accelerator opening sensor 44 (vehicle stopping detecting means), a position sensor 45 (vehicle stopping detecting means), a brake sensor 46 (vehicle stopping detecting means), and a vehicle weight sensor 47 (vehicle weight detecting means). The engine-rotational speed sensor 41 detects a rotational speed of the output shaft of the engine 500. The input shaft rotational speed sensor 42 detects the rotational speed of the input shaft 11 of the transmission 10. The output shaft rotational speed sensor 43 detects the rotational speed of the output shaft 12 of the transmission 10. The rotational speed of the output shaft 12 detected by the sensor 43 corresponds to the vehicle speed. The accelerator opening sensor 44 detects the depressing force applied to an accelerator pedal 51 associated with a throttle opening degree of the engine 500. The position sensor 45 detects the actual range of the manual shift lever operated by the driver. The brake sensor 46 detects whether or not the brake pedal 52 has been depressed by the driver. The vehicle weight sensor 47 detects the distance from the axle shaft to the vehicle body.

A vehicle weight A is detected or determined in the following manner. The ECU 400 first calculates the difference between the vehicle weight detected by the vehicle weight sensor 47 and the vehicle weight under a no load condition of the vehicle. The vehicle weight A is then calculated by adding the vehicle weight under no load to the calculated difference multiplied by a coefficient value. The ECU 400 sets the above-described seven shift patterns corresponding to the ON-OFF SOL valves 200, 210, 220 that are respectively electrically excited or electrically de-excited. The ECU 400 further controls the linear SOL valves 200, 210, 220 upon each shift pattern. Therefore, a desired shift stage is performed in the transmission 10, based upon outputs from the above-described sensors.

Table 2 shows the shift patterns set by the ECU 400, with the condition of the ON-OFF SOL valves and the five friction engagement elements being illustrated upon each shift pattern.

TABLE 2

| Shift Pattern | ON-OFF SOL Valves | | | Friction Engagement Elements | | | | | A shift stage for generating output force | | | | | | |
|---|---|---|---|---|---|---|---|---|---|---|---|---|---|---|---|
| | 200 | 210 | 220 | C1 | C2 | C3 | B1 | B2 | N | 1 | 2 | 3 | 4 | 5 | 6 |
| 1 | ○ | X | X | ③ | | | ① | ② | ☆ | * | * | | | | |
| 2 | ○ | X | ○ | ◎ | | | ① | ② | | ☆ | ☆ | | | | |
| 3 | ○ | ○ | ○ | ◎ | | ② | ① | | | | * | ☆ | | | |
| 4 | ○ | ○ | X | ◎ | | ② | | | | | | * | | | |
| 5 | X | ○ | X | ① | ③ | ② | | | | | | * | ☆ | ☆ | |
| 6 | X | ○ | ○ | ① | ◎ | ② | | | | | | | * | * | |
| 7 | X | X | ○ | ① | ◎ | ② | ③ | | | | | | * | * | ☆ |

Referring to Table 2, the section of table for the ON-OFF SOL valves 200, 210, 220 shows whether or not each of the ON-OFF SOL valves is electrically excited upon each shift pattern. The symbol ○ indicates that the ON-OFF SOL valve 200, 210, 220 is electrically excited while the symbol x indicates that the ON-OFF SOL valve 200, 210, 220 is not electrically excited.

The section of the table for the friction engagement elements C1, C2, C3, B1, B2 shows which of the friction engagement elements can be supplied with control pressure from each control valve 90, 100, 110 upon each shift pattern. The symbol ① indicates that the friction engagement element is supplied with the control pressure from the control valve 90, the symbol ② indicates that the friction engagement element is supplied with the control pressure from the control valve 100, and the symbol ③ indicates that the friction engagement element is supplied with the control pressure from the control valve 110.

The shift stage section of the table for generating an output force shows the shift stage at which the output force can be generated upon each shift pattern. The shift stage section of the table for generating the output force includes a shift stage when the vehicle is normally running and a transmittable shift stage upon a shift operation. When the vehicle is normally running, the shift stage for generating output force is set to be the highest shift stage so as to improve a response upon a down-shift operation. The symbol ☆ in the table indicates an actually selected shift stage when the vehicle is normally running. The symbol * in the table indicates an actually selected shift stage when the shift operation is performed.

Figure 3:
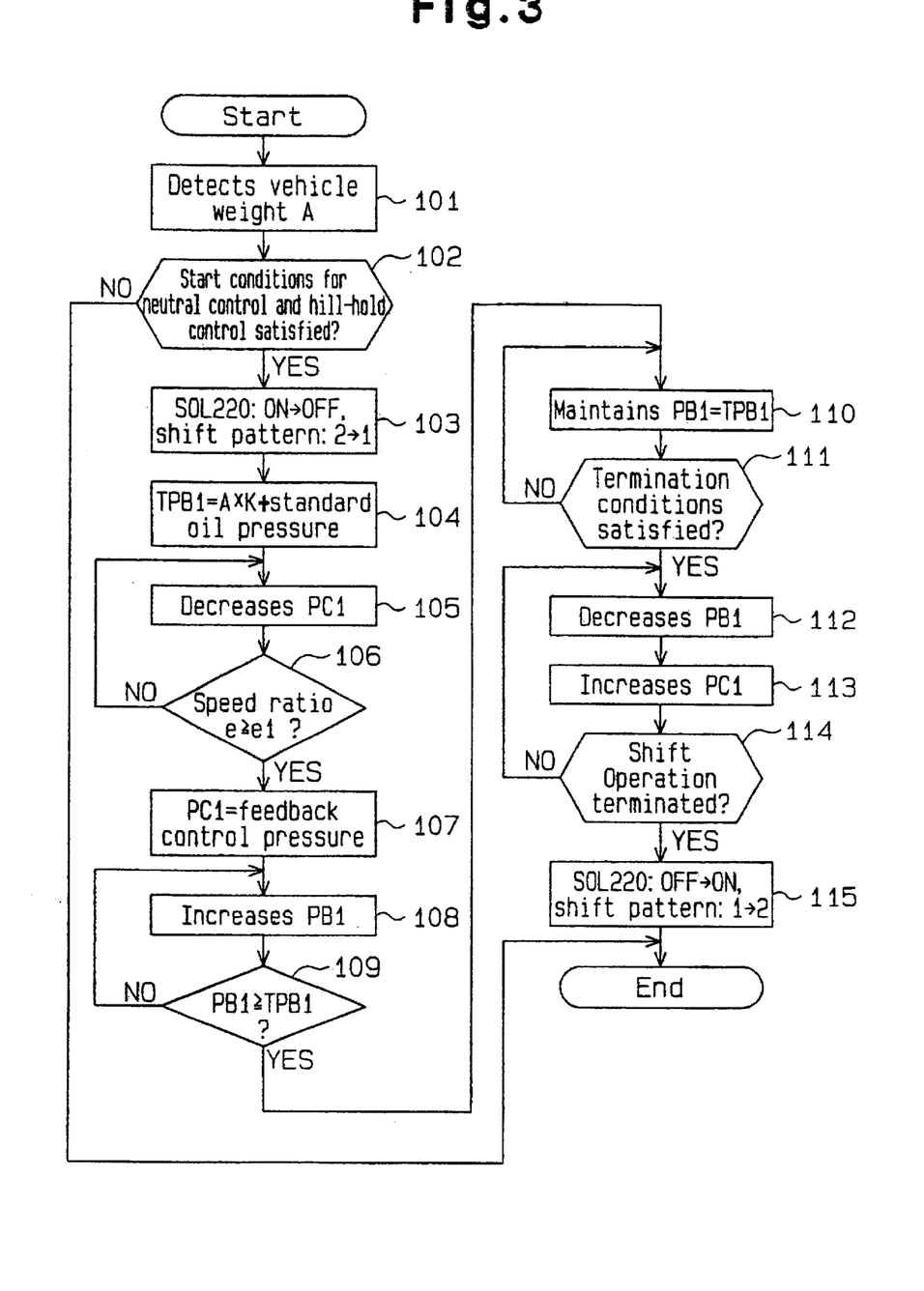
FIG. 3 is a flow chart setting forth a program for performing a neutral control and a hill-hold control in accordance with the present invention.

Described below with reference to the flowchart in FIG. 3 is a description of the neutral control and hill-hold control in the transmission 10 according to the disclosed embodiment of the present invention. At step 101, the vehicle weight A is detected by the vehicle weight sensor 47 and the ECU 400 as described above. At step 102, the program determines if the start conditions are satisfied to start the neutral control and the hill-hold control. The start conditions for the neutral control and for the hill-hold control are satisfied when the ECU 400 determines that four conditions are satisfied simultaneously. The four conditions are: 1) when the position sensor 45 detects that the manual shift lever is positioned at a "D" range; 2) when the output shaft rotational speed sensor 43 detects the rotational speed of the output shaft to be a zero value; 3) when the accelerator opening sensor 44 detects the throttle opening degree to be a zero value; and 4) when the brake sensor 46 detects that the brake pedal 52 is depressed or not. The vehicle is running at a low speed until immediately before the start conditions are satisfied, wherein the transmission 10 performs a first shift stage upon the shift pattern illustrated in Table 2.

When the start conditions are satisfied at step 102, the program proceeds to step 103. At the step 103, the shift pattern 2 is switched to shift pattern 1 with the ON-OFF SOL valve 220 switched from the electrically excited condition to the electrically non-excited condition, wherein the transmission 10 establishes a neutral condition. Therefore, oil pressure PC1 supplied to the clutch C1 is switched from the line pressure to oil pressure generated by the linear SOL valve 80. The linear SOL valve 80 is electrically excited upon the shift pattern 2 to generate oil pressure which is an equivalent level with the line pressure and the oil pressure PC1 is not rapidly changed corresponding to switching from the shift pattern 2 to the shift pattern 1.

Figure 4:
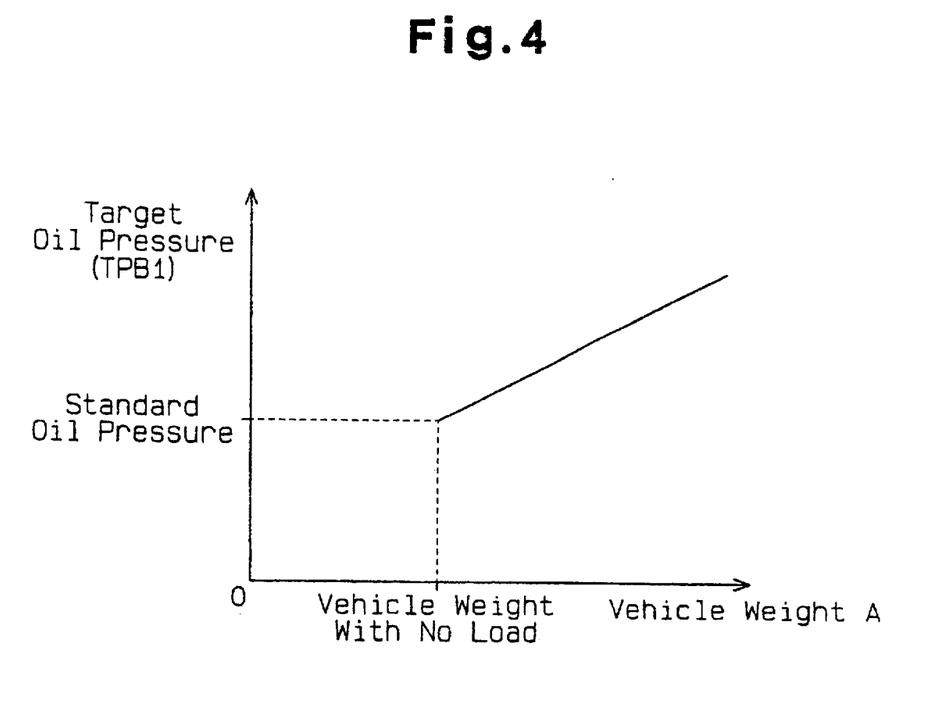
FIG. 4 is a graph showing the relationship between standard oil pressure and vehicle weight.

The program then proceeds to step 104. At the step 104, a target oil pressure TPB1 is determined with reference to the map illustrated in FIG. 4 to establish a hill-hold condition. The target oil pressure TPB1 corresponds to or is based on the vehicle weight A detected at step 101 and is supplied to the brake B1. Next, at step 105, the linear SOL valve 80 is electrically excited and the oil pressure PC 1 supplied to the clutch C1 is decreased at a constant gradient. At step 106, the program determines if a speed ratio e of the torque converter 2 is equal to or greater than a predetermined speed ratio e1. Accordingly, the program determines if an operation for performing the neutral control has been completed or not. The program determines that the operation for performing the neutral control has been completed when the oil pressure PC1 supplied to the clutch C1 is sufficiently decreased and the torque converter 2 is not connected to the automatic transmission 10. When the program determines that the speed ratio e is smaller than the predetermined speed ratio e1, the program returns to the step 105 to further decrease the oil pressure PC1 at the constant gradient. When the program determines that the speed ratio e is equal to or greater than the predetermined speed ratio e1, the program proceeds to step 107 and performs a feedback control of the oil pressure PC1 to maintain the speed ratio e at the level of the predetermined speed ratio e1. The program then proceeds to step 108.

At step 108, the linear SOL valve 60 is electrically excited and oil pressure PBI actually supplied to the brake B1 is increased at a constant gradient. At step 109, the program determines if the oil pressure PB1 supplied to the brake B1 reaches the target oil pressure TPB1. When the program determines that the oil pressure PB1 is smaller than the target oil pressure TPB1, the program returns to the step 108 to further increase the oil pressure PB1 at the constant gradient. When the program determines in step 109 that the oil pressure PBI has reached the target oil pressure TPB1, the program proceeds to step 110. At step 110, the oil pressure PB1 controls the supplied pressure to maintain the condition that the oil pressure PB1 has reached or equals the target oil pressure TPB1.

As described above, from step 102 through step 110, the neutral control and the hill-hold control of the automatic transmission 10 are performed. At step 111, the program determines whether or not the termination conditions of the neutral control and the hill-hold control are satisfied. The termination conditions are satisfied when at least one of the four start conditions at step 102 is not satisfied. When the termination conditions are satisfied, the program proceeds to step 112. At step 112, the linear SOL valve 60 is electrically controlled to decrease the oil pressure PB1. Next, at step 113, the linear SOL valve 80 is electrically excited to increase the oil pressure PC1. The pressure decrease at step 112 and the pressure increase at step 113 are repeatedly performed until the program determines at step 114 that the shift operation to the first forward shift stage has been completed. When the program judges that the shift operation to the first forward shift stage has terminated, the hill-hold control is released with the brake B1 disengaged and the neutral control is released with the clutch C1 engaged. At step 115, the ECU 400 switches the ON-OFF SOL valve 220 from the electrically non-excited condition to the electrically excited condition corresponding to switching from the shift pattern 1 to the shift pattern 2, wherein the line pressure is supplied to the clutch C1. The neutral control and the hill-hold control are thus terminated through the above-described steps.

Set forth below is a description of further operations associated with the neutral control and the hill-hold control by the automatic transmission 10 according to the disclosed embodiment of the present invention. When the manual shift lever is positioned at the "D" range and the first forward shift stage is performed in the transmission 10 before the neutral control is performed, the clutch C1 is engaged with the line pressure supplied to the clutch C1. The other frictional engagement elements C2, C3, B1, B2 are disengaged. In this case, the rotation of the engine 500 is hydraulically transmitted to the input shaft 11 via the torque converter 2. Referring to FIG. 1, the rotation of the input shaft 11 is transmitted to a sun gear S3 of the third planetary gear G3 via the clutch C1 and then is transmitted to the output shaft 12. When the vehicle is stopped in response to depression of the brake pedal 52 under the above-described condition, the output shaft 12 is not rotated any more. Therefore, the rotation of the input shaft 11 which had been transmitted to the output shaft 12 is employed as the sliding loss in the torque converter 2. When the start conditions are satisfied at step 102, the rotation of the input shaft 11 is not transmitted to the output shaft 12 with the clutch C1 disengaged. That is, communication between the torque converter 2 and the automatic transmission 10 is interrupted. Therefore, the neutral control is performed and the sliding loss in the torque converter 2 is decreased.

When the brake B1 is supplied with oil pressure under the neutral control being performed, the brake B1 is engaged with an engaging pressure corresponding to the vehicle weight A. Therefore, the hill-hold control so that the vehicle does not retract backward is performed taking into consideration the vehicle weight A. The hill-hold control is effectively performed in the following manner.

When the vehicle is running on the up-hill under the neutral control being performed, the vehicle normally undesirably moves backward. However, according to the embodiment of the present invention, when the output shaft 12 is applied with a force to be rotated in a reverse direction of the output shaft rotating direction upon forward movement of the vehicle, the second planetary gear G2 and the third planetary gear G3 are not rotated in the reverse direction by virtue of the engagement of the one-way clutch F1 and the brake B1. Therefore, the other force is applied to the output shaft 12 for preventing the output shaft 12 from being rotated in the reverse direction. Therefore, the output shaft 12 can be prevented from being rotated in the reverse direction and the vehicle can be then prevented from being moved backward.

As an alternative to the vehicle weight detecting means for detecting the vehicle weight A, the vehicle weight A may be detected by using a weight sensor which directly detects the load of the vehicle. Further, an estimated vehicle driving power can first be calculated based upon the rotational speed of each of the engine 500, the input shaft 11, the output shaft 12, and the actually selected shift stage. The vehicle weight A is then estimated based upon the estimated driving power and the vehicle accelerating speed.

The automatic transmission 10 according to the disclosed embodiment of the present invention is provided with five engagement elements. However, as an alternative automatic transmission, the automatic transmission 10 may be provided with friction engagement elements which functionally corresponds to the first friction engagement element, the second friction engagement element and the third friction engagement element.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A control system for an automatic transmission having an input shaft and an output shaft comprising:
    a torque converter disposed between a driving power source and a speed change gear unit to hydraulically transmit rotation of the driving power source to the speed change gear unit;
    a first friction engagement element engageable to connect the torque converter and the speed change gear unit;
    a second friction engagement element engageable to perform a forward driving shift stage in the speed change gear unit;
    a third friction engagement element engageable to generate an engaging force to prevent the output shaft from being rotated in a reverse direction;
    vehicle stopping detecting means for detecting a vehicle stopped condition when a forward driving range is selected;
    vehicle weight detecting means for detecting a weight of the vehicle; and
    control means for controlling a disengaging operation of the first and second friction engagement elements and an engaging operation of the third friction engagement element with the engaging force in response to the vehicle weight detected by the vehicle weight detecting means when the vehicle stopped condition is detected by the vehicle stopping detecting means while the forward driving range is selected.

2. The control system for an automatic transmission according to claim 1, wherein the control means increases the engaging force of the third friction engagement element when an increased vehicle weight is detected by the vehicle weight detecting means.

3. The control system for an automatic transmission according to claim 1, wherein the first friction engagement element and the second friction engagement element are formed by a single friction engagement element.

4. The control system for an automatic transmission according to claim 1, wherein the vehicle stopping detecting means detects the vehicle stopped condition when the forward driving-range is selected, a vehicle speed is approximately zero, an accelerator pedal is not depressed, and a brake pedal is depressed.

5. The control system for an automatic transmission according to claim 1, wherein the vehicle stopping detecting means includes an output shaft rotational speed sensor which detects a rotational speed of the output shaft.

6. The control system for an automatic transmission according to claim 1, wherein the vehicle stopping detecting means includes an accelerator opening sensor which detects an opening degree of a throttle of the driving power source.

7. The control system for an automatic transmission according to claim 1, wherein the vehicle stopping detecting means includes a position sensor which detects a position of a shift lever.

8. The control system for an automatic transmission according to claim 1, wherein the vehicle stopping detecting means includes a brake sensor which detects if a brake pedal has been operated.

9. A method of controlling an automatic transmission in a vehicle that includes a torque converter which hydraulically transmits rotation of a driving power source having an output shaft to a speed change gear unit, a first friction engagement element engageable to connect the torque converter and the speed change gear unit, a second friction engagement element engageable to perform a forward driving shift stage in the speed change gear unit, and a third friction engagement element engageable to generate an engaging force to prevent the output shaft from being rotated in a reverse direction, the method comprising:
    determining a weight of the vehicle;
    determining a stopped condition of the vehicle when a forward driving range is selected; and
    controlling a disengaging operation of the first and second friction engagement elements and an engaging operation of the third friction engagement element by the engaging force based on the determined weight of the vehicle when the vehicle is determined to be stopped while the forward driving range is selected.

10. The method according to claim 9, including increasing the engaging force of the third friction engagement element based upon an increase in the weight of the vehicle.

11. The method according to claim 9, wherein the vehicle is determined to be in the stopped condition when the forward driving-range is selected, when a speed of the vehicle is zero, when an accelerator pedal is not depressed, and when a brake pedal is depressed.

12. The method according to claim 9, wherein the determination of the stopped condition of the vehicle includes detecting a rotational speed of the output shaft.

13. The method according to claim 9, wherein the determination of the stopped condition of the vehicle includes detecting an opening degree of a throttle of the driving output source.

14. The method according to claim 9, wherein the determination of the stopped condition of the vehicle includes detecting a position of a shift lever.

15. The method according to claim 9, wherein the determination of the stopped condition of the vehicle includes detecting if a brake pedal has been operated.

16. The method according to claim 9, including determining a target oil pressure based on the determined weight of the vehicle and supplying the target oil pressure to the third friction engagement element.

* * * * *